(12) United States Patent
Akintunde

(10) Patent No.: US 12,165,221 B2
(45) Date of Patent: Dec. 10, 2024

(54) PODROOM

(71) Applicant: Tolulope Akintunde, Raleigh, NC (US)

(72) Inventor: Tolulope Akintunde, Raleigh, NC (US)

( * ) Notice: Subject to any disclaimer, the term of this patent is extended or adjusted under 35 U.S.C. 154(b) by 0 days.

(21) Appl. No.: 17/895,044

(22) Filed: Aug. 24, 2022

(65) Prior Publication Data
US 2022/0414793 A1 Dec. 29, 2022

Related U.S. Application Data

(63) Continuation-in-part of application No. 16/719,948, filed on Dec. 18, 2019, now abandoned.
(Continued)

(51) Int. Cl.
| | | |
|---|---|---|
| G06Q 50/00 | (2024.01) | |
| G06F 3/048 | (2013.01) | |
| G06F 3/0482 | (2013.01) | |
| G06Q 30/0203 | (2023.01) | |
| G06Q 30/0241 | (2023.01) | |
| H04L 12/18 | (2006.01) | |
| H04L 51/04 | (2022.01) | |
| H04L 51/216 | (2022.01) | |
| H04L 65/61 | (2022.01) | |
| H04L 67/02 | (2022.01) | |
| H04M 1/72442 | (2021.01) | |
| H04N 21/4788 | (2011.01) | |
| H04N 21/482 | (2011.01) | |
| H04W 4/12 | (2009.01) | |

(52) U.S. Cl.
CPC ............ *G06Q 50/01* (2013.01); *G06F 3/048* (2013.01); *G06F 3/0482* (2013.01); *G06Q 30/0203* (2013.01); *G06Q 30/0277* (2013.01); *H04L 12/1813* (2013.01); *H04L 51/04* (2013.01); *H04L 51/216* (2022.05); *H04L 65/61* (2022.05); *H04L 67/02* (2013.01); *H04M 1/72442* (2021.01); *H04N 21/4788* (2013.01); *H04N 21/482* (2013.01); *H04W 4/12* (2013.01); *G06F 2203/04803* (2013.01)

(58) Field of Classification Search
CPC ............... G06Q 50/01; G06Q 30/0203; G06Q 30/0277; H04L 12/1813; H04L 51/04; H04L 65/61; H04L 51/216; H04L 67/02; H04N 21/4788; H04N 21/482; G06F 3/048; G06F 3/0482; G06F 2203/04803; H04M 1/72442; H04W 4/12
See application file for complete search history.

(56) References Cited

U.S. PATENT DOCUMENTS

| | | | |
|---|---|---|---|
| 10,735,363 B1 * | 8/2020 | Knas | G06F 3/048 |
| 11,650,789 B1 * | 5/2023 | Goffman | G06F 16/64 |
| | | | 715/727 |

(Continued)

*Primary Examiner* — Nicholas Ulrich
(74) *Attorney, Agent, or Firm* — Bold IP PLLC; Christopher Mayle

(57) ABSTRACT

A system and method for a podcast community that creates an avenue for listeners to provide feedback to podcasters. These solutions include websites, web applications, mobile applications and algorithms that connect people listening to podcasts around the world. The mobile application creates a forum where podcast listeners can listen and comment on podcast episodes. Listeners can interact with each other, podcasters and featured guests on the applications. Users and podcasters can also attach media files to comments and podcasts respectively.

19 Claims, 15 Drawing Sheets

Related U.S. Application Data

(60) Provisional application No. 62/784,560, filed on Dec. 24, 2018.

(56) References Cited

U.S. PATENT DOCUMENTS

| | | | |
|---|---|---|---|
| 2006/0190616 A1* | 8/2006 | Mayerhofer | H04L 67/567 709/231 |
| 2006/0265637 A1* | 11/2006 | Marriott | G11B 27/11 |
| 2016/0226926 A1* | 8/2016 | Singh | G06F 3/00 |
| 2018/0077093 A1* | 3/2018 | Vaknin | H04L 51/046 |
| 2019/0141402 A1* | 5/2019 | Cornell | G06F 3/0483 |
| 2020/0285440 A1* | 9/2020 | Prindle | G06F 16/9566 |

* cited by examiner

PODROOM

CROSS REFERENCE TO RELATED APPLICATIONS

This application is a continuation-in-part of U.S. Non-Provisional Application Ser. No. 16/719948 filed on Dec. 18, 2019 which claims priority to U.S. Provisional Application No. 62/784,560 filed on Dec. 24, 2018. The entire disclosures of U.S. Non-Provisional application Ser. No. 16/719,948 and U.S. Provisional Application No. 62/784,560 are included herein in their entirety at least by reference.

FIELD OF DISCLOSURE

The general field pertains generally to technology and more particularly to podcasts and live TV technologies. The present invention enhances pre-existing concepts in the podcast streaming technology by incorporating a unique system for the development of a podcast community, centralizing conversations, and providing a real time community to listeners as well as a functioning feedback system for podcasters.

BACKGROUND

There are a variety of podcast streaming applications which are commonly used for accessing and listening to episodes of podcasts. Users of these applications can subscribe to different podcasts while using these applications. These applications notify users when a new episode which the user has subscribed to has been released. Examples of this kind of streaming applications are Apple podcast, Google podcast and Spotify. While these applications may be suitable for providing listeners with podcast episodes, they are ineffective for managing the feedback or comments users may have while or after listening to these episodes. Another problem with these existing systems is that they are unable to provide a centralized community where podcasters can consult in order to access feedback for every episode.

For instance, a user called John, who lives in Manhattan, listens to a podcast called "Why is this happening" by Chris Hayes. To make a comment or send feedback: he has to go out of these existing podcast applications to send emails to Chris Hayes' podcast team or use Twitter with the hashtag of that episode. He doesn't get responses to his feedback because either he used a wrong hashtag or the podcasters missed his email. Furthermore, John wishes to interact with other listeners of the same podcast show to share ideas and create a community but there is no forum that currently provides these services. Another feature which appears to be missing in prior podcast applications is the ability to attach media files. This feature is necessary for podcast listeners to attach links, pictures, audio files and other media files to their comments. Podcasters can also broadcast media files to listeners using this feature. Accordingly, there is a need for a centralized podcast community that connects people listening to the same shows from around the world.

DEFINITIONS

Podcast: Episodic series of digital audio or video files which a user can download and listen to. Podcasters: A person that makes and publishes podcasts Listeners: People who subscribe, download and listen to podcasts Users: People who use podcast applications Podcast streaming applications: Special client application software that accesses the web feeds, check for updates an downloads new files in a podcast series. Chat Room: Group of people providing feedback and comments about a podcast episode

SUMMARY

It is the object of the present invention to provide improved technological solutions to the lack of a centralized podcast community and effective feedback system. It is another object of the present invention to provide improved technological solutions that connect people who listen to the same shows from around the world.

It is yet another object of the present invention to provide improved technological solutions that involve mechanisms or algorithms that group people from all walks of life who are listening to a podcast episode at the same time together to chat, interact and have a live experience. It is another object of the present invention to provide improved technological solutions that involve mechanisms or algorithms that groups users listening to a particular podcast together in real time and presents the most current forum to them so that discussion rooms will be kept up to date and the chat experience will be current and lively for users.

It is another object of the present invention to provide an improved podcast streaming application that allows users to subscribe to podcasts, stream podcast episodes, connect with listeners real time, connect with podcasters, connect with podcast featured guests, have a live experience and attach media files to the forum.

It is another object of the present invention to provide an improved podcast streaming application that allows podcasters to manage their podcasts and corresponding episodes, claim podcasts, respond to listeners, open chat rooms, close chat rooms, attach media files including image, audio, and video to podcast episodes, and promote adverts.

It is another object of the present invention to provide an improved podcast streaming application that eliminates the need for users to go out of the podcast environment to make comments and feedback about their points of view. It is another object of the present invention to provide an algorithm that detects episodes having the trending or popular chat rooms and recommends these chatrooms to users.

It is another object of the present invention to provide technological solutions that provides podcasters with analytics about their podcasts, when and where episodes are being listened to, the number of people listening at any point in time, the number of people interacting on each episodes of their podcasts and the rate at which users respond to the adverts in their episodes.

Finally, it is another object of the present invention to provide improved technological solutions that serve as sources of data to discern the opinions of the public. This can be done through surveys on the platform of the present invention. These and other objects known to the inventor are achieved with the present inventions by providing technological solutions that consist of web, mobile applications and algorithms. The mobile applications, designed for all mobile operating systems including IOS and android, has the ability to stream podcasts, download podcasts, synchronized user podcast subscriptions from existing podcast streaming applications, authenticate users, as well as allow users to listen to and comment on podcast episodes. In furtherance of the objectives of the present invention, the mobile application enables podcasters to upload video podcasts or podcasts with visuals. Users can also watch these video podcasts and make comments on them. Finally, the present invention features a web application or website where podcasters can manage their podcasts, view advert clicks and ultimately receive analytics about their podcast episodes.

BRIEF DESCRIPTION OF DRAWINGS

The present invention will be described by way of exemplary embodiments, but not limitations, illustrated in the accompanying drawings in which like references denote similar elements, and in which:

FIG. 4 shows the landing page users see after they have successfully logged in.

DETAILED DESCRIPTION

Figure 1:
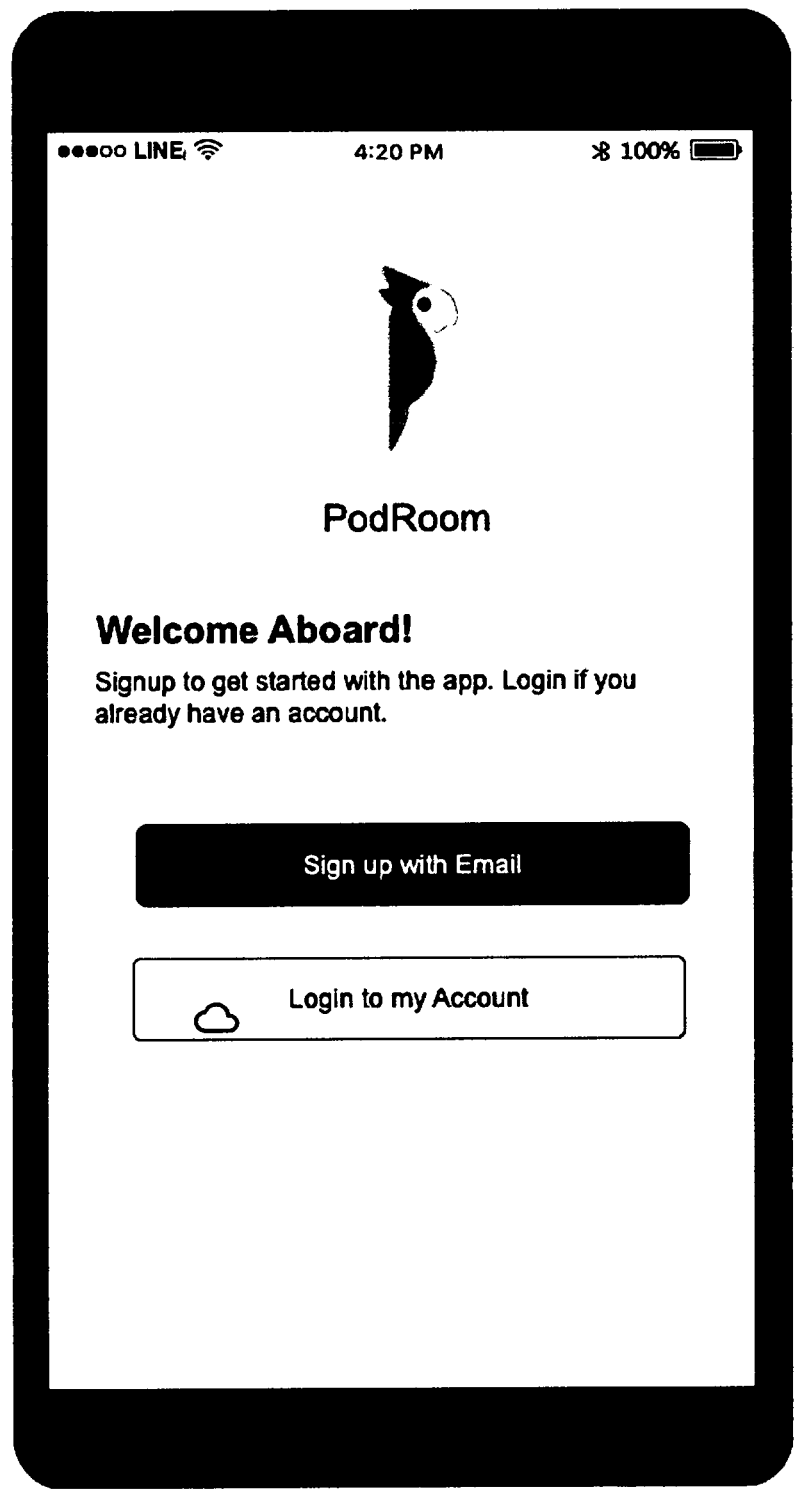
FIG. 1 shows the welcome page of the said mobile application. Users can sign up with their email address and password.
Figure 2:
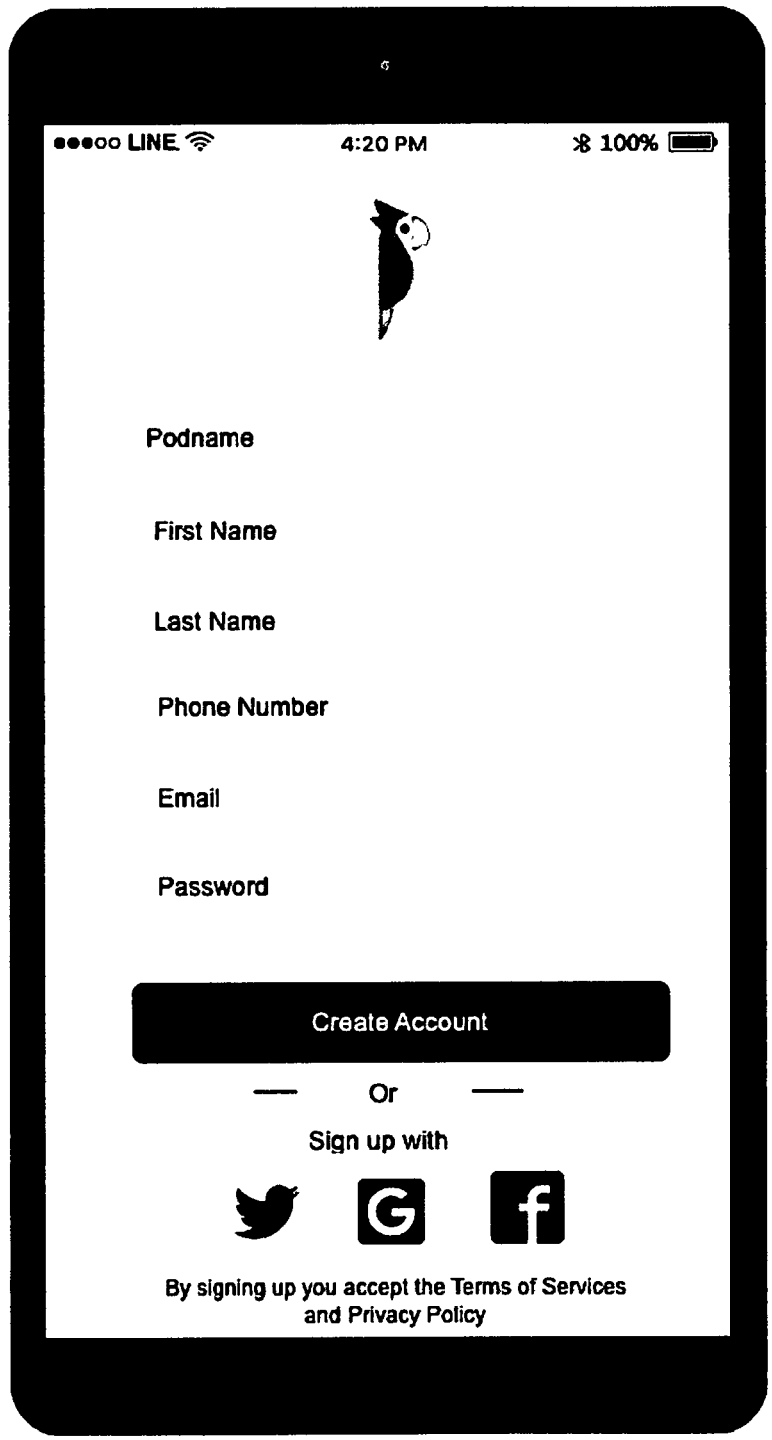
FIG. 2 shows the sign-up page where the user creates a profile in order to access the mobile application. Users can also create an account with Gmail, Facebook or Twitter authentication.
Figure 3:
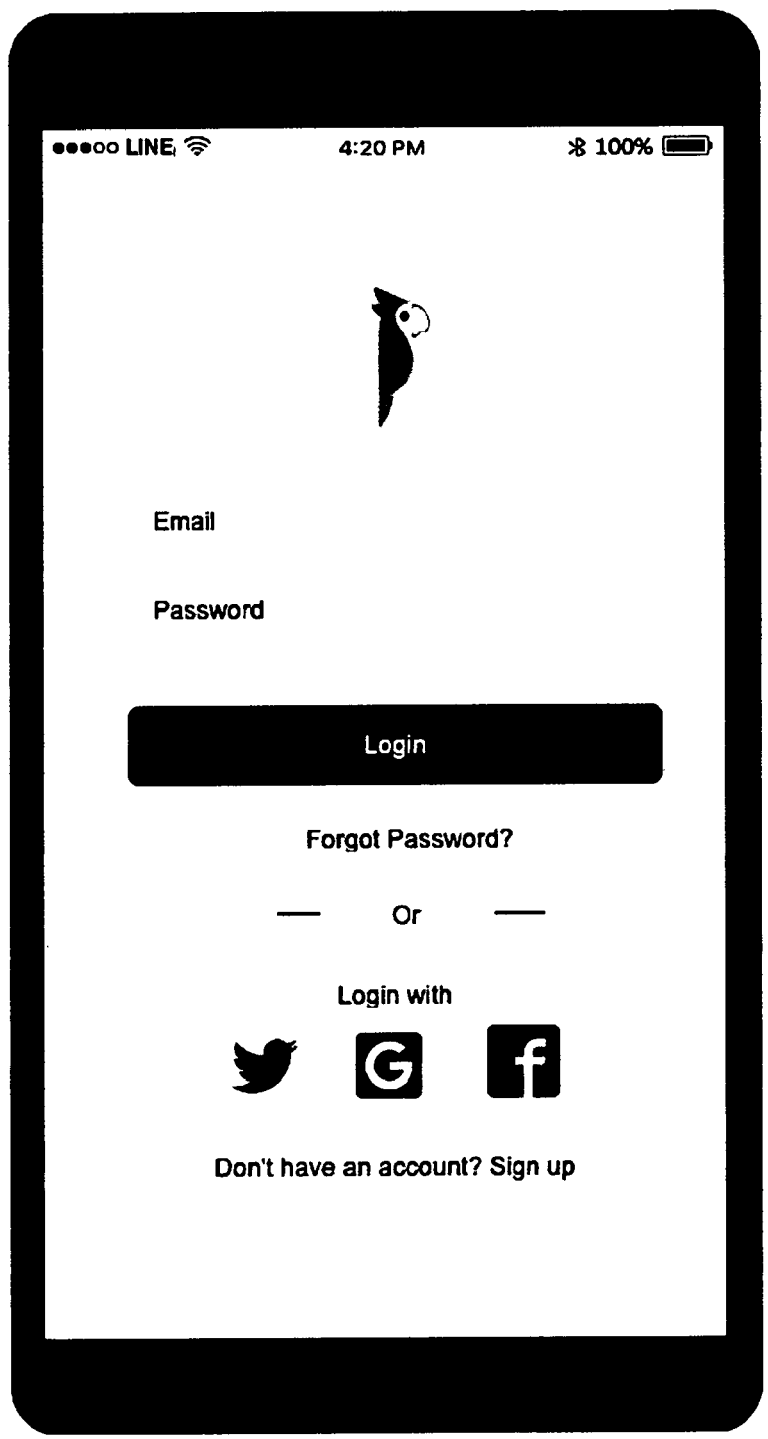
FIG. 3 shows the login page for users who have already created a profile.

In the Summary above and in this Detailed Description, and the claims below, and in the accompanying drawings, reference is made to particular features of the invention. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skills in the art that the invention may be practiced without these specific details. In other instances, well-known features have not been described in detail to avoid unnecessarily complicating the description.

Figure 4:
Figure 5:
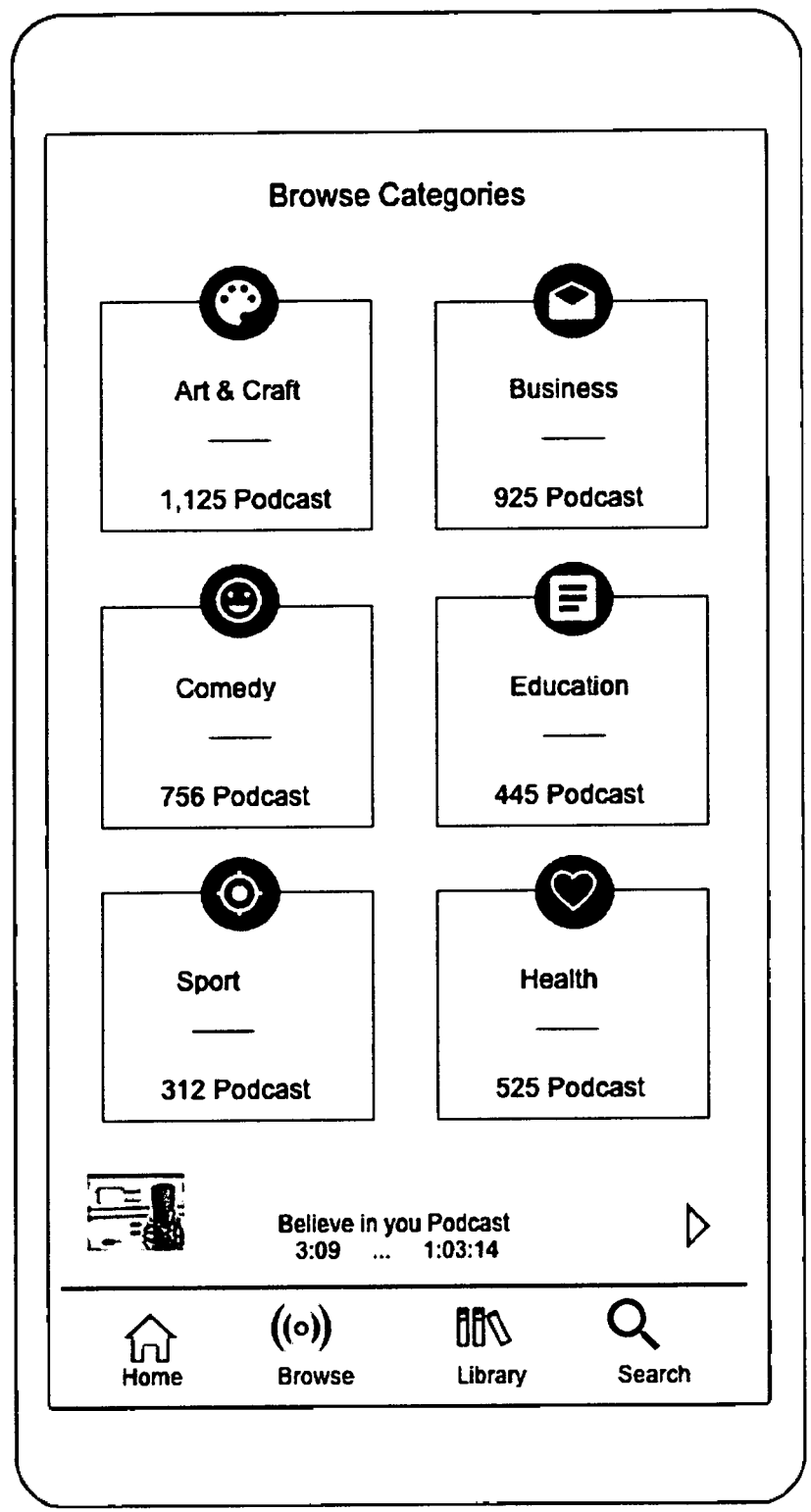
FIG. 5 shows the Browse page where users can view podcasts available to them by category.
Figure 6:
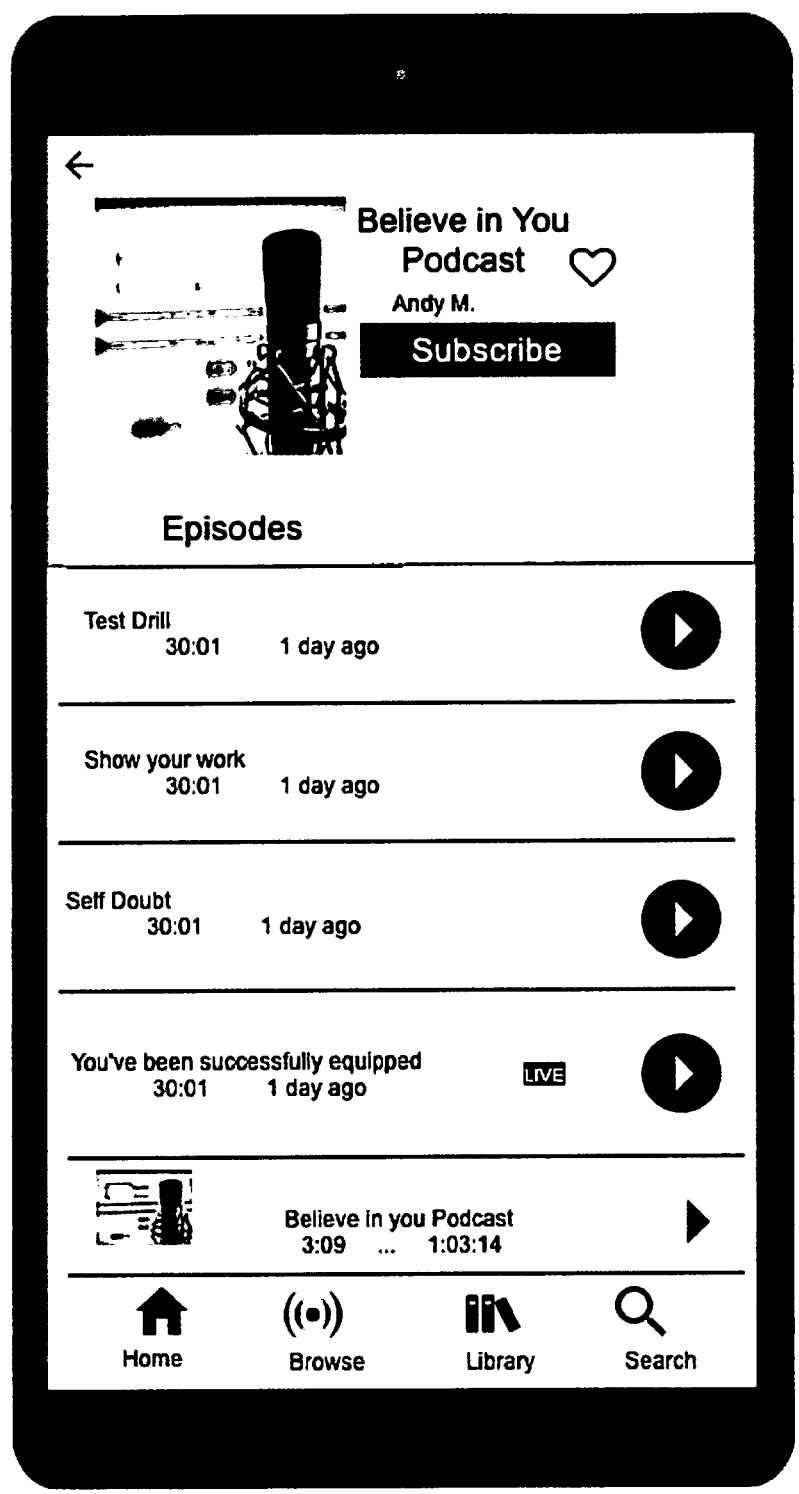
FIG. 6 shows a podcast and the first few episodes of the podcast. It also features a live icon which indicates that the chatroom for an episode is opened.
Figure 7:
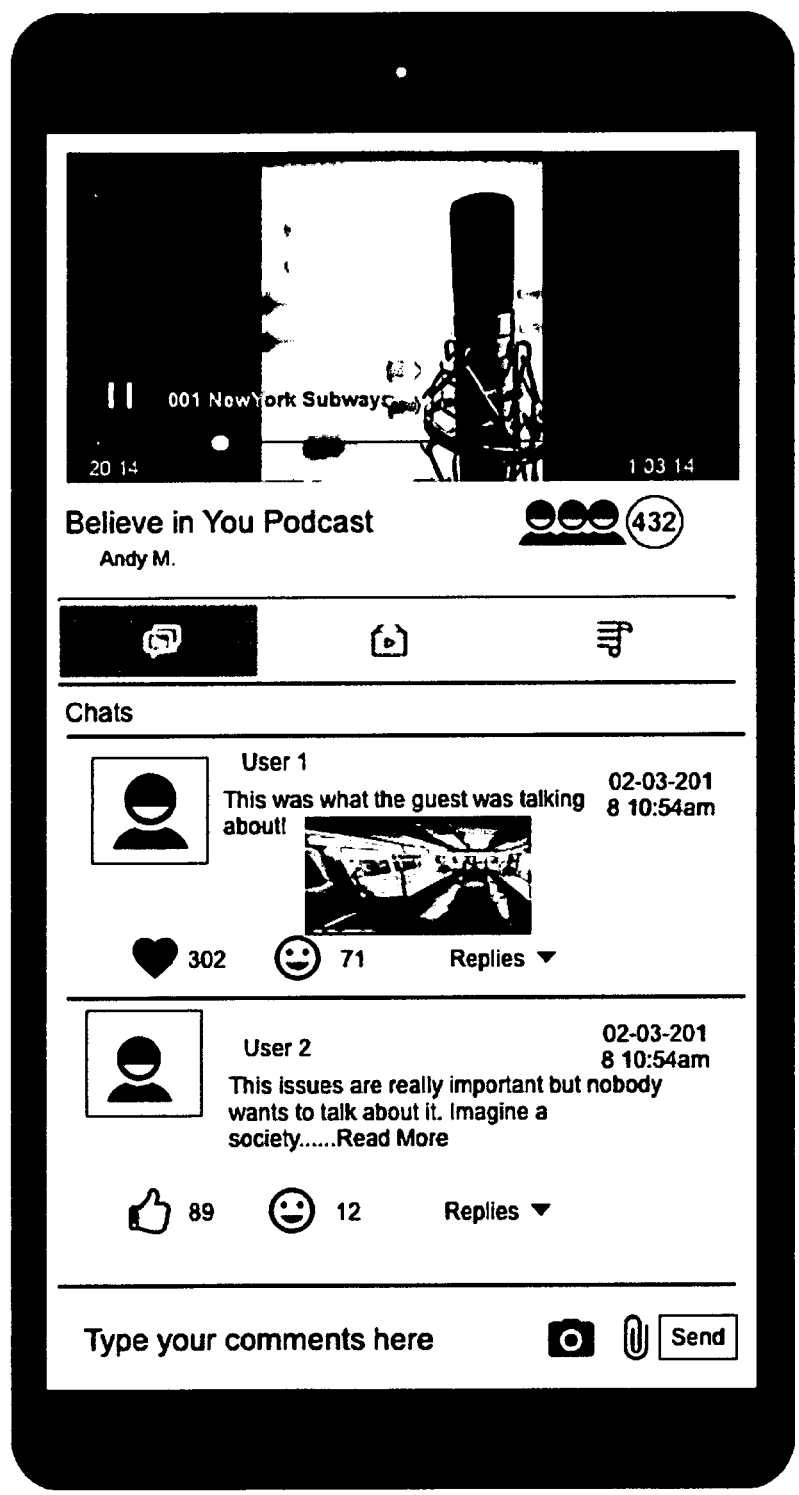
FIG. 7 shows a podcast episode being played on a chat forum by listeners. Listeners can also attach media files while responding to the podcast.
Figure 8:
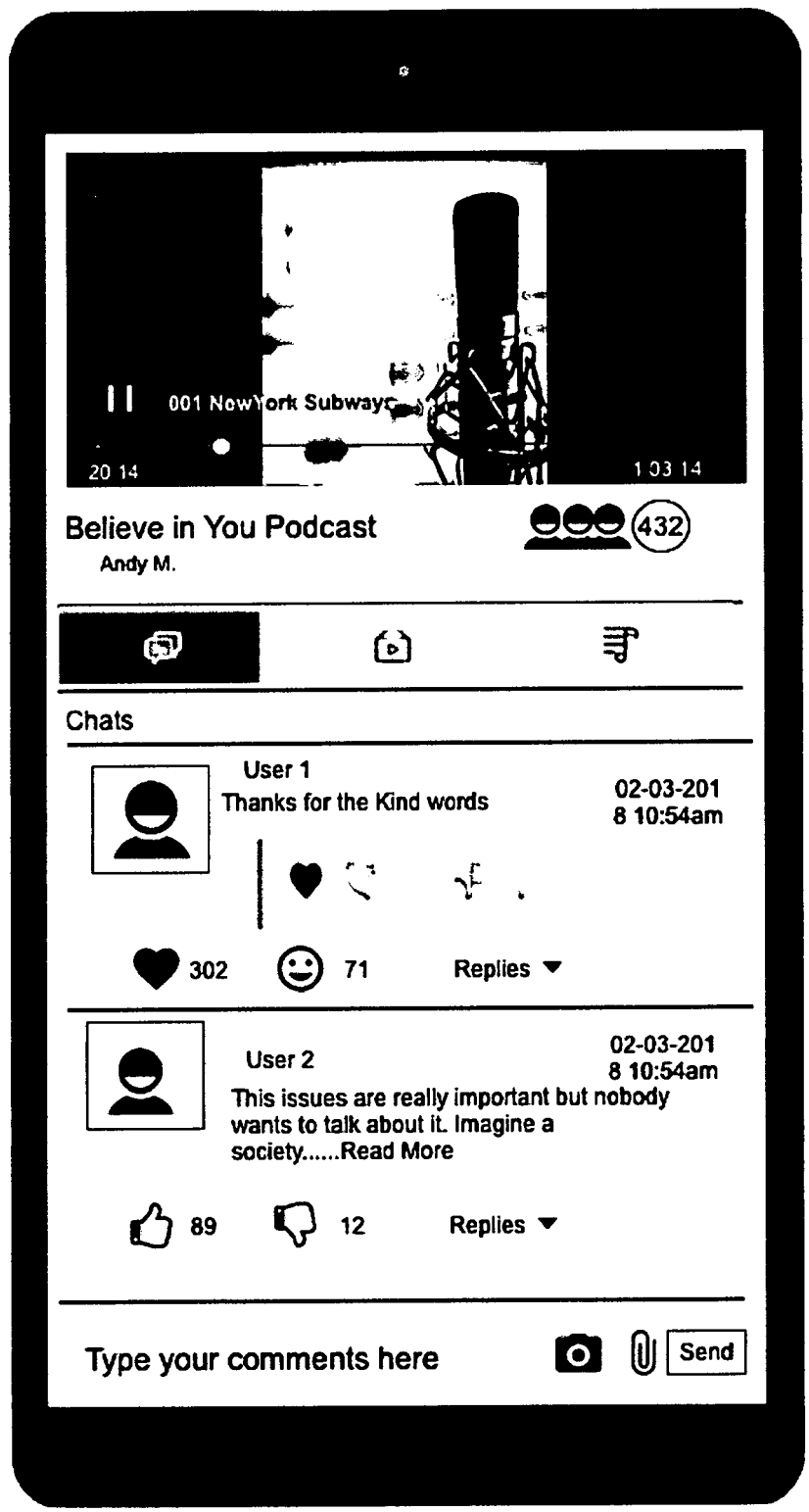
FIG. 8 shows a podcast episode being played with user comments as well as reactions.
Figure 9:
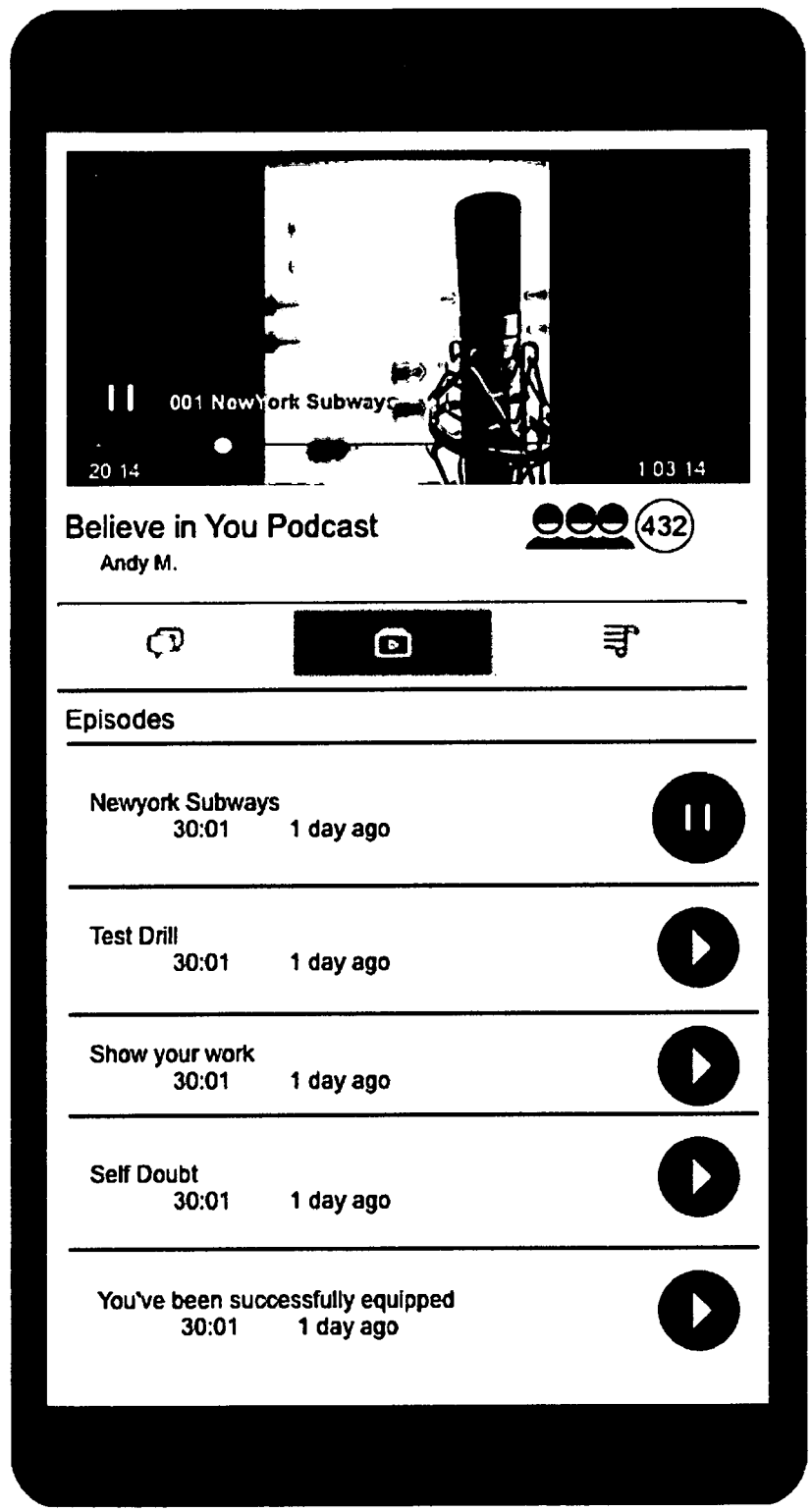
FIG. 9 shows a podcast episode being played with few of other episodes in the podcasts shown.
Figure 10:
FIG. 10 shows a podcast episode being played with similar podcasts or episodes shown.
Figure 11:
FIG. 11 shows the user's library. It enables users to subscribe to podcasts and show a list of podcasts users have subscribed to. Here, users can also upload or download podcasts.
Figure 12:
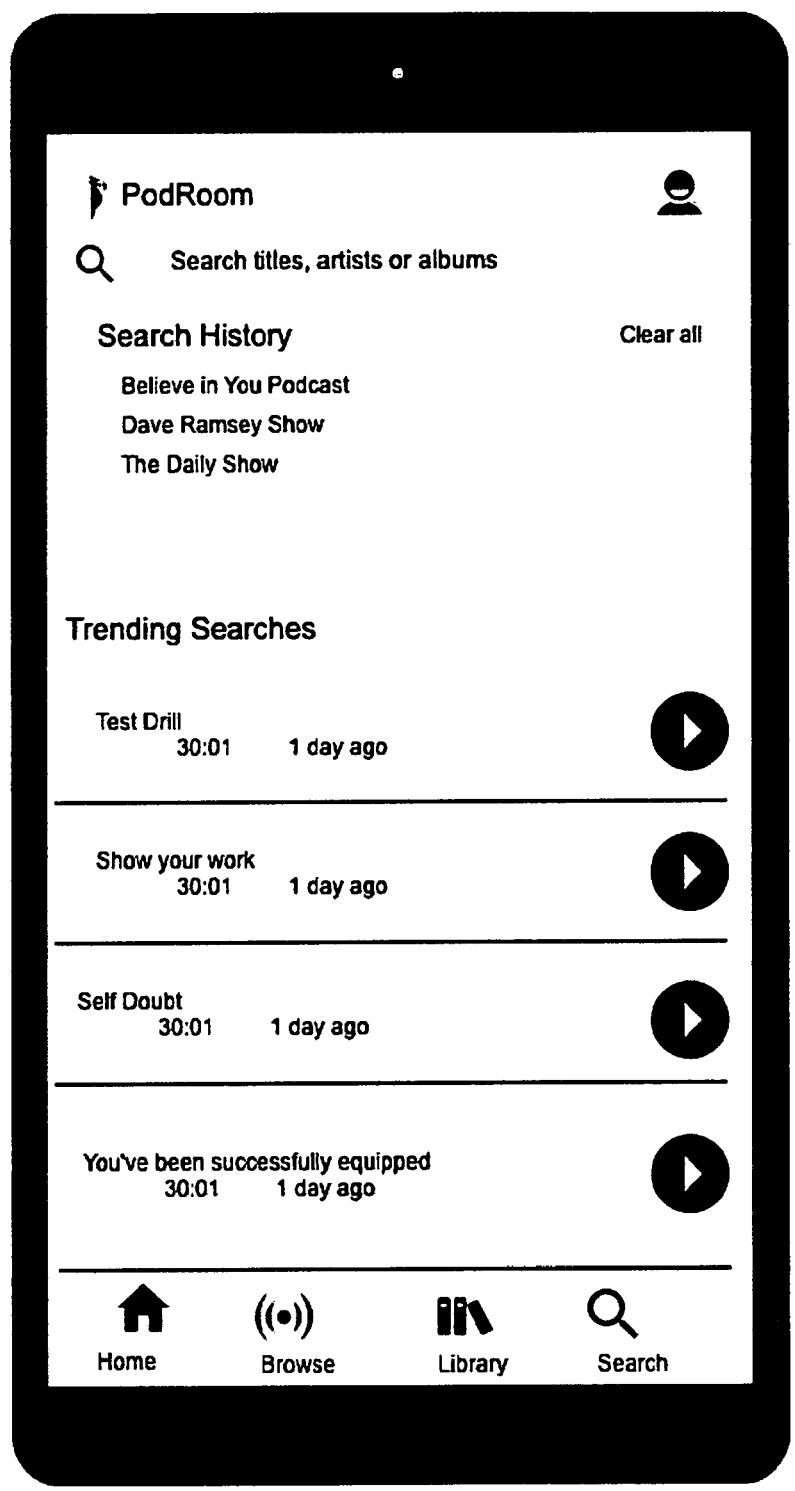
FIG. 12 shows a library search page where users can search for podcasts and subscribe.
Figure 13:
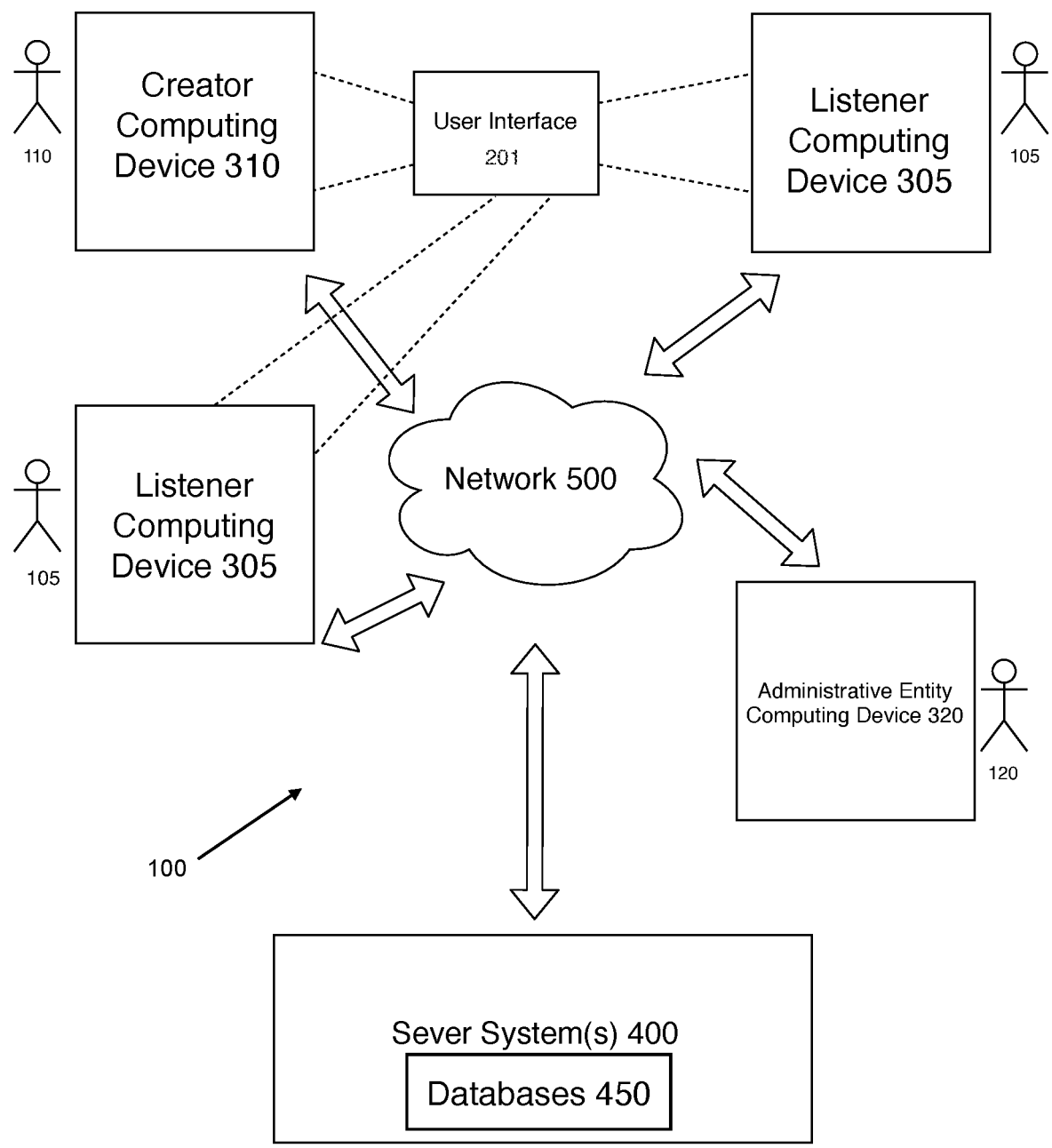
FIG. 13 shows a block diagram of the podcast system.

FIG. 1-12 gives a brief visual representation of the said mobile application. FIG. 1 shows the welcome page. On click of sign up, users are presented with the view in FIG. 2. Users can create a profile using the view in FIG. 2. Users can login using the view in FIG. 3. After users have successfully logged in, they are presented the view in FIG. 4. FIG. 4 shows recommendations of previously recorded podcasts with popular chat rooms as well as trending podcasts. These recommendations are engendered using said algorithms. Users can choose to click on recommended podcasts and listen, chat, interact and enjoy all the features of the application. When users click on the "Browse" tab as shown in FIG. 4, they are redirected to the view in FIG. 5. FIG. 5 shows podcasts available to users, grouped by categories. If users decide to select a podcast, they see the view in FIG. 6, a list of episodes in the selected podcast. On click of an episode, users can listen to the episode and comment as described in FIG. 7. Users can also show reactions to other users' comments as shown in FIG. 8. Users can choose to view other episodes in the podcast as shown in FIG. 9 and see similar episodes or podcasts as shown in FIG. 10. Podcasts which users are subscribed to are found in the Library as shown in FIG. 11. Users can upload and download podcasts using this page. Users can search for podcasts as shown in FIG. 12.

FIG. 1 is a block diagram of podcast system 100 constructed in accordance with the principals of the current invention. Podcast system 100 may include one or more listeners 105 and one or more creators 110. Listeners 105 and creators 110 may be located in various physical locations that are either located apart or are located in the vicinity of one other. Listeners 105 and creators 110 of podcast system 100 may access a user interface such as user interface 201 using a listener computing device 305 and a creator computing device 310. User interface 201 may have a plurality of buttons or icons that are selectable through user interface 201 by users 105 and creators 110 to instruct podcast system 100 to perform particular processes in response to the selections.

Listener 305 and creator computing device 310, may be in communication with one or more servers 400 such as server 400 via one or more networks such as network 500. Server 400 may be located at a data center or any other location suitable for providing service to network 500 whereby server 400 may be in one central location or in many different locations in multiple arrangements. Server 400 may comprise a database server such as MySQL® or Maria DB® server. Server 400 may have an attached data storage system storing software applications and data. Server 400 may receive requests and coordinate fulfillment of those requests through other servers. Server 400 may comprise computing systems similar to listener computing device 305 and creator computing device 310.

In one or more non-limiting embodiments, network 500 may include a local area network (LAN), such as a company Intranet, a metropolitan area network (MAN), or a wide area network (WAN), such as the Internet or World Wide Web. Network 500 may be a private network, a public network, or a combination thereof. Network 500 may be any type of network known in the art, including a telecommunications network, a wireless network (including Wi-Fi), and a wireline network. Network 500 may include mobile telephone networks utilizing any protocol or protocols used to communicate among mobile digital computing devices (e.g., listener computing device 305 and creator computing device 310), such as GSM, GPRS, UMTS, AMPS, TDMA, or CDMA. In one or more non-limiting embodiments, different types of data may be transmitted via network 500 via different protocols. In further non-limiting other embodiments, listener computing device 305 and creator computing device 310 may act as standalone devices or they may operate as peer machines in a peer-to-peer (or distributed) network environment.

Network 500 may further include a system of terminals, gateways, and routers. Network 500 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices if, for instance, they are in a remote location not accessible by other networks.

Podcast system 100 may also include one or more administrative entities such as administrative entity 120. While administrative entity 120 is depicted as a single element, communicating over network 500, administrative entity 120 in one or more non-limiting embodiments may be distributed over network 500 in any number of physical locations. Administrative entity 120 may manipulate the software and enter commands to server 400 using any number of input devices such as keyboard and mouse. The input/output may be viewed on a display screen to administrative entity 120.

Figure 14:
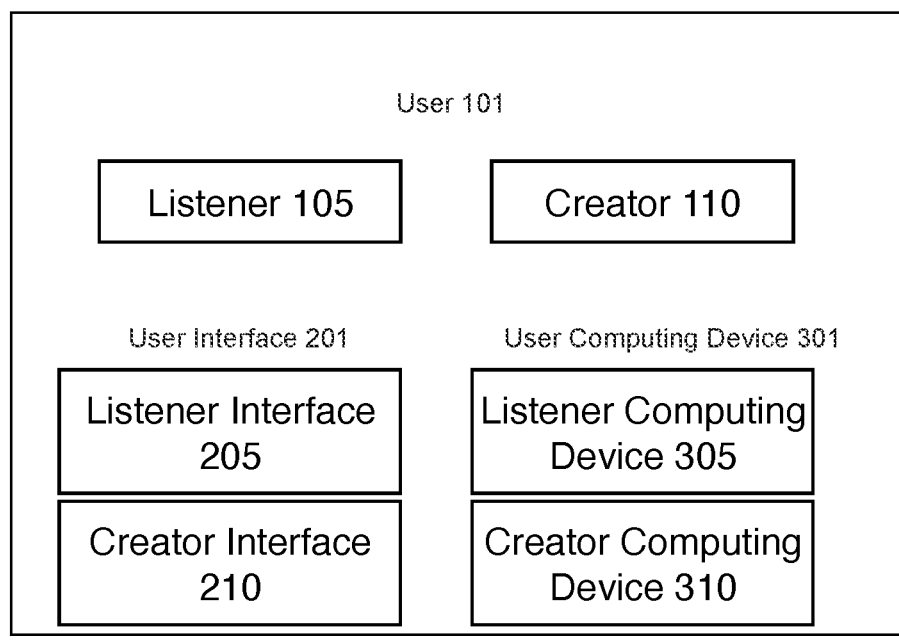
FIG. 14 shows a block diagram of the users

Listeners 105 and creators 110 may be users such as users 101, as illustrated in FIG. 14, of podcast system 100 whereby listeners 105 may have the capacity to function as creators 110 creating podcasts. Listeners 105 may also have the capacity to function as creators 110 and in the reverse fashion.

Though listeners 105 and creators 110 may be users 101 with the same computing device, such as user computing device 301 and user interface 201, they may also have unique user computing devices 301 specifically tailored to the processes they wish to carry out on podcast system 100. User computing device 301 may be any type of user computing device 301 that typically operates under the control of one or more operating systems, which control tasks and access to system resources.

Figure 15:
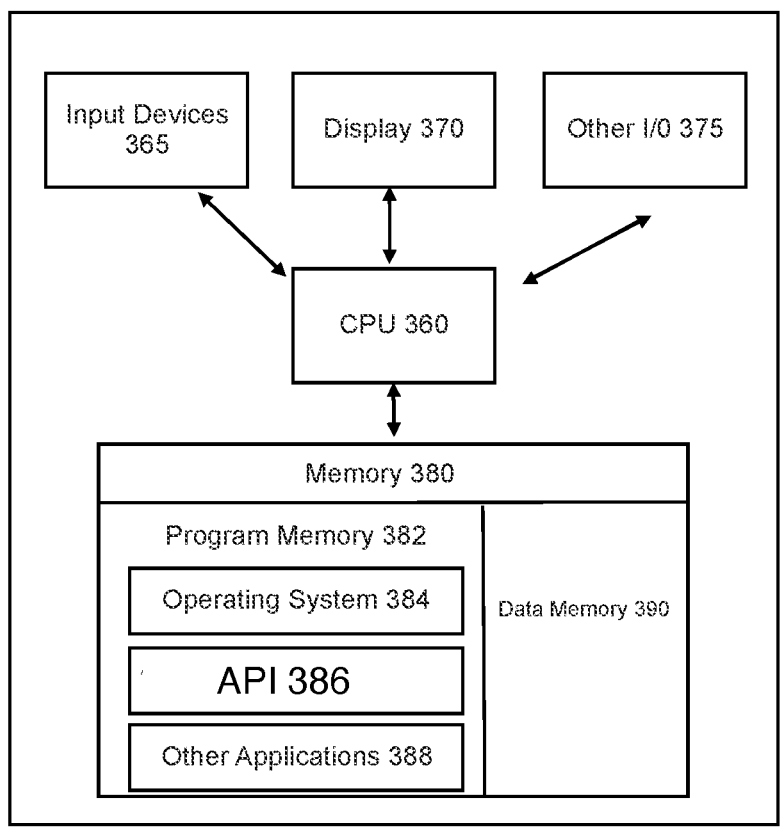
FIG. 15 shows a block diagram of the computing device.

One or more embodiments of user computing device 301 is further detailed in FIG. 15. User computing device 301 may comprise hardware components that allow access to edit and query podcast system 100. User computing device 301 may include one or more input devices such as input devices 365 that provide input to a CPU (processor) such as CPU 360 notifying it of actions. The actions may be mediated by a hardware controller that interprets the signals received from input device 365 and communicates the information to CPU 360 using a communication protocol. Input devices 365 may include but are not limited to a mouse, a keyboard, a touchscreen, an infrared sensor, a touchpad, a wearable input device, a camera- or image-based input device, a microphone, or other user input devices known by those of ordinary skill in the art.

CPU 360 may be a single processing unit or multiple processing units in a device or distributed across multiple devices. CPU 360 may be coupled to other hardware devices, such as one or more memory devices with the use of a bus, such as a PCI bus or SCSI bus. CPU may communicate with a hardware controller for devices, such as for a display 370. Display 370 may be used to display text and graphics. In some examples, display 370 provides graphical and textual visual feedback to a user. In some implementations, display 370 may include an input device 365 as part of display 370, such as when input device 365 is a touchscreen or is equipped with an eye direction monitoring system. In some implementations, display 370 is separate from input device 365. Examples of display 370 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Other I/O devices such as I/O devices 375 may also be coupled to the processor, such as a network card, video card, audio card, USB, FireWire or other external device, camera, printer, speakers, CD-ROM drive, DVD drive, disk drive, or Blu-Ray device.

CPU may have access to a memory such as memory 380. Memory 380 may include one or more of various hardware devices for volatile and non-volatile storage and may include both read-only and writable memory. For example, memory 380 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 380 is not a propagating signal divorced from underlying hardware; a memory is thus non-transitory. Memory 380 may include program memory such as program memory 382 capable of storing programs and software, such as an operating system such as operating system 384, podcast system API 386, and other computerized programs or application programs such as application programs 388. Memory 380 may also include data memory such as data memory 390 that may include database query results, configuration data, settings, user options or preferences, etc., which may be provided to program memory 382 or any element of user computing device 301.

User computing devices 301 may in some embodiments be mobile computing devices such as an iPhone, Android-based phone, or Windows-based phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processor power and memory capacity to perform operations of podcast system 100 while in communication with network 500. Client computing device 305, business computing device 310, and employee computing device 315, may have location tracking capabilities such as Mobile Location Determination System (MLDS) or Global Positioning System (GPS) whereby they may include one or more satellite radios capable of determining the geographical location of computing device.

Server 400 may comprise a number of modules that provide various functions related to podcast system 100 using one or more computing devices similar to user computing device 301. Server 400 may comprise a number of databases 450. Modules may be configured to receive commands or requests from user computing devices 301, server 400, and outside connected devices over network 500. Server 400 may comprise components, subsystems, and modules to support one or more management services for podcast system 100. For example, server 400 may include modules operative to maintain presence information for one or more users 101 and to provide chat functionality allowing users 101 to communicate messages in a chat through podcast system 100.

Listeners 105 and creators 110 may initially register to become a registered user 101 associated with podcast system 100 and podcast system API 386. Podcast system 100 may be downloadable and installable on user computing devices 301 through an API. In one or more non-limiting embodiments, podcast system 100 may be preinstalled on user computing devices 301 by the manufacturer or designer. Further, podcast system 100 may be implemented using a web browser via a browser extension or plugin.

Upon initially signing up with podcast system 100 through podcast system API 386, user 101 may be prompted to provide an email address. After entering an email address, user 101 may be presented with a text window interface whereby user 101 may enter their name, username, password, phone number and address. In one or more non-limiting embodiments, location of user 101 may be verified by server 400 using the global positioning system (GPS) capabilities of the computing devices. Server 400 then may generate a code that is transmitted to user's 101 selected email or user computing device 301 by text message whereby user 101 may verify their account by entering the generated code into a text block window.

Creators 110 and listeners 105 may opt-in for various podcast system 100 notifications to be transmitted by server 400. Creators 110 and listeners 105 may opt-in to allow podcast system 100, through podcast system API 386, to notify users 101 when certain events occur, such as events related to other users 101. In further embodiments, user 101 may establish one or more different profiles whereby the different profiles may individually have different podcasts.

In one or more non-limiting embodiments, user 101 may be required to provide credentials to the third-party service provider to allow access by podcast system 100. User 101 may also authorize social network access whereby when a social network service is linked to podcast system 100, access may be granted to various accounts of user 101 and importing of data from those accounts may occur such as to import one or more social network contacts. If user 101 authorizes access, server 400 collects or otherwise accesses certain address book information and stores the information in databases 450. Server 400 may then proceed to match contacts with other users who have granted similar access to podcast system 100. Matching may occur through the use of phone numbers, email addresses, or social network identification tags.

Upon successful authentication of creator 110, a creator profile page may be generated whereby creator profile may be visible to creator 110 and other users 101 on podcast system 100. Creator profile pages may be modified, deleted, written to, or otherwise administered by their respective user 101. Administrative entity 120 may modify or delete a creator profile page, for example, as a result of inactivity or inappropriate action. Display to creator 110 through user interface 201 may comprise a number of different subpages viewable or accessible through user interface 201 by selecting one or more tabs. Tabs may include a profile, business, notifications, calendar, and search tabs which may be displayed through user interface 201 in a region that displays the tabs no matter which tabs have been selected by user 101. User interface 201 may allow creators 110 to upload podcasts in audio or video format whereby the podcasts are stored in the one or more databases 450. Creators 110 may also insert additional information pertaining to the podcasts such as name and information about the podcast.

Server 400 may have an audio module and a video module which receive and process audio and video data, respectively, from creator computing devices 310. The audio module may include, among other modules or components for processing audio data, speech detection and recognition modules and codecs for processing incoming or outgoing video data. A speech detection module can be configured to detect instances of speech at a site (for example, to trigger recording or other functions of podcast system 100), and/or determine the relative physical location of the detected speech for use in controlling the operation of individual microphones at the site. Speech recognition may be used to distinguish between individual voices for the purpose of filtering out another voice.

The video module may include image recognition modules for use in detecting speech and appropriate codecs for use in processing incoming or outgoing video data. The image recognition modules may include face tracking or pattern recognition algorithms. The audio and video modules may also include, respectively, interfaces for data communication between input units such as microphones and cameras, and output units such as speakers and display screens. The selection and implementation of appropriate speech and video modules, including codecs and speech detection/recognition modules, image recognition modules, including appropriate encoding, decoding, and compression algorithms, are those understood by those of ordinary skill in the art. Podcast system 100 may also be equipped with security modules providing end-to-end security with other systems and intermediate host systems.

When accessing podcast system 100, listeners 105 may be presented with a homepage of feature podcasts or new podcasts whereby the podcasts displayed may be based on listener 105 previous data or selected interests. In one or more non-limiting embodiments, listeners 105 may search for podcasts of creators 110 to listen to the podcast. User interface 201 may present to listeners 105 a search window whereby a search request having a character string may be entered, where one or more podcasts or creators 110 may be identified using name, the type of podcast, or other metadata pertaining to creator 110. Server 400 may then retrieve the podcast or creators 110 related to the search and display the results to listener 105 or a list of podcasts or creators 110 that meet the search criteria.

After selecting a podcast from the list of podcasts, listener 105 may be presented with a podcast screen with various options including chatting, listening, searching for related podcasts, and searching for previous podcasts by creator 110 of the podcasts selected. Listener 105 may be presented with a selectable button through user interface 201 for beginning a podcast. After selecting this option, listener 105 may be presented with the audio or video from the podcast whereby the user may scroll through the podcast to listen to various time points of the podcast. Podcast pages may also have various visual indicators or features in a separate section whereby the visual features may correspond to a number of viewers including listener 105 and other users 101 that are currently viewing the podcast or on the page as well as a special indicator that creator 110 of the podcast is currently viewing the page. In some embodiments when listener 105 is searching through podcasts, podcasts that have the creator 110 currently viewing the podcast page may be highlighted or have a different indicator.

The podcast page may include a chat tab that may be selected by users 101 for displaying a chat messaging interface at the bottom of the screen, generated by server 400. In one or more non-limiting embodiments, the chat messaging interface displayed to user 101 has controls through user interface 201 that allow creators 110 to join in the chat with a different associated color or other indicator and may establish a chat session directly with listeners 105 in a separate window. Additionally, user interface 201 may allow listeners 105 to upload associated data including any file attachments, images, or videos directly from camera on user computing device 301 or a photo library stored on user computer device 301 whereby the data will be presented in the chat window and visible to other users 101. Chat tab may also be enlarged when listener 105 interacts with the chat tab whereby the podcast playback menu is minimized. In one or more non-limiting embodiments chat tab may automatically enlarge to most of the screen when a new message pops up or somebody replies to them or creator 110 creates a post.

User interface 201 may provide options for listeners 105 to comment with a like or unlike option or a reaction from a set of reaction options. Creator 110 may be provided tools by server 400 where they may delete or otherwise comment by listeners 105 in the chat window such that they may moderate their page accordingly. Creator 110 may also be notified by server 400 of all comments or specific comments directed to them. Notifications may also be sent to all other users 101 whereby special indicators may be displayed if a creator 110 has commented to a listener. Server 400 may allow listeners 105 to send and receive invite requests for the podcast whereby server 400 may transmit the invite request which if accepted will direct listener 105 to the podcast page.

In some non-limiting embodiments, comments by other listeners 105 or creators 110 in the chat window may only appear based on the timestamp of listener 105. For instance, since the podcast is prerecorded someone might comment on a part that listener 105 has not yet reached and would be spoiled by the comment. This may be determined in a plurality of ways. First, server 400 may determine a timestamp of the podcast when a user 101 has made the comment and then only apply said comment to the chat window when the time has been reached by listener 105 or within a predetermined threshold such as 1 minute before or after the timestamp. Second, server 400 may analyze the podcast using the video and audio modules for specific words or phrases or objects that are in podcast and then apply this information to the comments by users 101 such that comments having those words or phrases or concerning those objects only appear to listener 105 after the first time the audio and video modules determine their appearance in the podcast. Third, a creator 110 may insert information pertaining to spoilers of the podcast and their specific time whereby server 400 may determine if comments have this information and then only apply it after the specific time inserted by creator 110.

The podcast page may include a creator tab that may be selected by users 101 for displaying previous podcasts by creator 110 that have been stored in database 450. The podcast page may include a discover page tab that may be selected by users 101 for displaying recommended podcasts on podcast system 100 that have been stored in databases 45 as well as snippets or highlights of one or more newly created podcasts of the first series or other series.

In some non-limiting embodiments, podcast system 100 may include a regression-based model that accepts the prior podcasts listened to by listeners 105 as input data. Basically if enough of the one or more previous users 101 gave that podcast being listened to by listener 105 a good rating and other podcasts a good rating a cluster may be created that then may be applied to the listener 105 to recommend podcasts. The trained machine learning algorithm may be of any suitable form, and may include, for example, a neural network. A neural network may be software representing a human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through the connections' weight. A neural network may include, for example, a convolutional neural network, a deep neural network, or a recurrent neural network.

The trained machine learning algorithm may compute recommended prior podcasts listened to by other listeners as well as their ratings and other data. The one or more variables may be derived from listening and rating data. This function may be learned by training the machine learning algorithm with training sets. The machine learning algorithm may be trained by supervised, unsupervised, or semi-supervised learning using training sets comprising data of types similar to the type of data used as the model input. For example, the training set used to train the model may include any combination of the following: listening data and rating data. Additionally, the training set used to train the model may further include user data, including, but not limited to, podcast name, creator name and other data related to users 101. The machine learning model may be trained to map input variables to a quantity or value of recommended podcasts for listener 105. That is, the machine learning model may be trained to determine a recommended podcast as a function of various input variables.

The trained machine learning model may utilize principal component analysis (PCA). The PCA may convert a set of variables or input data into a set of values of linearly uncorrelated variables, which include a first principal component that has the largest possible variance. For example, listening data and ratings data may be converted to a set of variables representing other characteristics of the user or entity. The PCA may be used to define one or more variables that are more important than other variables or reduce the number of variables needed to be trained and computed by a machine learning model. Overlapping qualities after a predetermined number of occurrences in past podcasts listened to by listeners 105 or given ratings above a predetermined threshold may create a cluster which then may be stored as one or more variables to speed up the process and calculate recommend podcasts for listeners 105 who are listening to one of the podcasts in the cluster at a more accurate manner whereby the cluster provides a higher weighted average in the determination of recommended podcasts and be presented to the user.

Podcast system 100 may have a payment module on server 400 that communicates with at least one third-party payment facilitator over network 500. Payment facilitators may include credit or debit card providers and billing service providers that perform invoicing and related functions whereby listeners 105 may donate to creators 110 for the creation of podcasts. Once doing so listeners may receive special perks such as unique indicators in the chat window as well as early access to future podcasts.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed:

1. A method comprising:
   providing, by a computing device, to a first user, a graphical user interface, the graphical user interface having a first region and a second region, wherein a podcast that has been previously recorded of a first series by a creator is presented in the first region, and wherein one or more feedback is presented in the second region that displays content in responses to one or more feedback options from the first user, one or more second users, and the creator of the podcast, wherein the one or more feedback is presented to the first user, the one or more second users, and the creator; and
   causing one or more second previously podcasts of the first series to be displayed on a second tabbed section of the second region.

2. The method of claim 1, the method further comprising:
   uploading media files into the second region for viewing in response to the one or more feedback options while the podcast is being presented on the graphical user interface, the media files including image, audio, and video, the media files displayed to the first user, the one or more second users, and the creator through the graphical user interface.

3. The method of claim 1, the method further comprising:
   determining that the creator accessing the podcast has selected a feedback option in response to the podcast; and
   causing at least one visual feature corresponding to the selected feedback option to be displayed in the second region while the podcast is still being presented, the visual feature having a specific color corresponding to the creator, the at least one visual feature displayed to the first user, the one or more second users, and the creator through the graphical user interface.

4. The method of claim 1, the method further comprising:
   determining that the first user accessing the podcast has selected a feedback option in response to the podcast; and
   causing at least one visual feature corresponding to the selected feedback option to be displayed in the second region while the podcast is still being presented, the at least one visual feature displayed to the first user, the one or more second users, and the creator through the graphical user interface.

5. The method of claim 1, the method further comprising:
   causing one or more second series podcasts of a second series with a relation to the first series to be displayed on a third tabbed section of the second region.

6. The method of claim 5, the method further comprising:
   causing one or more related podcasts of one or more second series to be displayed on the third tabbed section of the second region.

7. The method of claim 6, the method further comprising:
   determining that the one or more second users accessing the podcast has selected a second feedback option in response to the podcast; and
   causing at least one visual feature corresponding to the second feedback option to also be displayed in the second region, wherein the second feedback option is one of a like option or a reaction from a set of reaction options.

8. The method of claim 7, the method further comprising:
   providing a visual feature in a third region, the visual feature corresponding to a number of viewers including the first user and the one or more second users currently viewing the podcast.

9. The method of claim 1, the method further comprising:
   moderating the second region in response to one or more administrative sections by the creator.

10. The method of claim 1, the method further comprising:
    receiving an invite request from the first user to the one or more second users for the podcast;
    transmitting the invite request to the one or more second users; and
    directing the one or more second users to the podcast.

11. The method of claim 1, the method further comprising:
    notifying the first user in response to the feedback if the feedback was directed to the first user.

12. The method of claim 1, the method further comprising:
    notifying the creator in response to feedback for the podcast.

13. The method of claim 1, the method further comprising:
    directing funds from the first user to the creator in response to a donation by the first user.

14. The method of claim 1, the method further comprising:
    causing a snippet or highlight of one or more newly created podcasts of the first series to be displayed on a discover page on the graphical user interface.

15. The method of claim 1, the method further comprising:
    determining a time-stamp of the podcast when a comment was made by the one or more second users; and
    showing the comment only once the time-stamp of the podcast is reached by the first user.

16. The method of claim 1, the method further comprising:

determining podcast information at a predetermined time using audio and video modules of the podcast; and showing a comment of the one or more second users having the podcast information only once the predetermined time is reached by the first user.

17. The method of claim 1, the method further comprising:

receiving podcast information of a podcast event and predetermined time of the podcasts events from the creator; and showing a comment of the one or more second users only once the predetermined time is reached by the first user.

18. A method comprising:

providing, by a computing device, to a first user, a graphical user interface, the graphical user interface having a first region and a second region, wherein a podcast that has been previously recorded of a first series by a creator is presented in the first region, and wherein one or more feedback is presented in the second region that displays content in responses to one or more feedback options from the first user, one or more second users, and the creator of the podcast, wherein the one or more feedback is presented to the first user, the one or more second users, and the creator;

training a machine learning model having a neural network with a series of layers to map at least one variable to a value of a second podcast that is recommended for the first user;

receiving a first podcast being listened to by the first user;

determining ratings by the one or more second users having the first podcast and the second podcast above a predetermined rating;

categorizing the first podcast and the second podcast into a stored digital cluster when a predetermined amount of the one or more second users have the first podcast and the second podcast overlapping; and recommending the second podcast in response to the stored digital cluster.

19. A method comprising:

providing, by a computing device, to a first user, a graphical user interface the graphical user interface having a first region and a second region, wherein a podcast of a first series by a creator is presented in the first region, and wherein one or more feedback is presented in the second region that displays content in responses to one or more feedback options from the first user, one or more second users, and the creator of the podcast, wherein the one or more feedback is presented to the first user, the one or more second users, and the creator;

uploading media files into the second region for viewing in response to the one or more feedback options while the podcast is being presented on the graphical user interface, the media files including image, audio, and video, the media files displayed to the first user, the one or more second users, and the creator through the graphical user interface;

determining that the creator accessing the podcast has selected a feedback option in response to the podcast;

causing at least one visual feature corresponding to the selected feedback option to be displayed in the second region while the podcast is still being presented, the at least one visual feature having a specific color corresponding to the creator, the at least one visual feature displayed to the first user, the one or more second users, and the creator through the graphical user interface;

determining that the first user accessing the podcast has selected the feedback option in response to the podcast;

causing the at least one visual feature corresponding to the selected feedback option to be displayed in the second region while the podcast is still being presented, the at least one visual feature displayed to the first user, the one or more second users, and the creator live through the graphical user interface;

causing one or more second previously podcasts of the first series to be displayed on a second tabbed section of the second region;

causing one or more second series podcasts of a second series with a relation to the first series to be displayed on a third tabbed section of the second region;

causing one or more related podcast of one or more second series to be displayed on the third tabbed section of the second region;

determining that the one or more second users accessing the podcast has selected a second feedback option in response to the podcast;

causing the at least one visual feature corresponding to the second feedback option to also be displayed in the second region, wherein the second feedback option is one of a like option or a reaction from a set of reaction options; and providing a visual feature in a third region, the visual feature corresponding to a number of viewers including the first user and the one or more second users currently viewing the podcast.

\* \* \* \* \*